May 21, 1940. H. W. HEY 2,201,971
GEAR SHIFTING MECHANISM
Filed Oct. 15, 1937 4 Sheets—Sheet 3
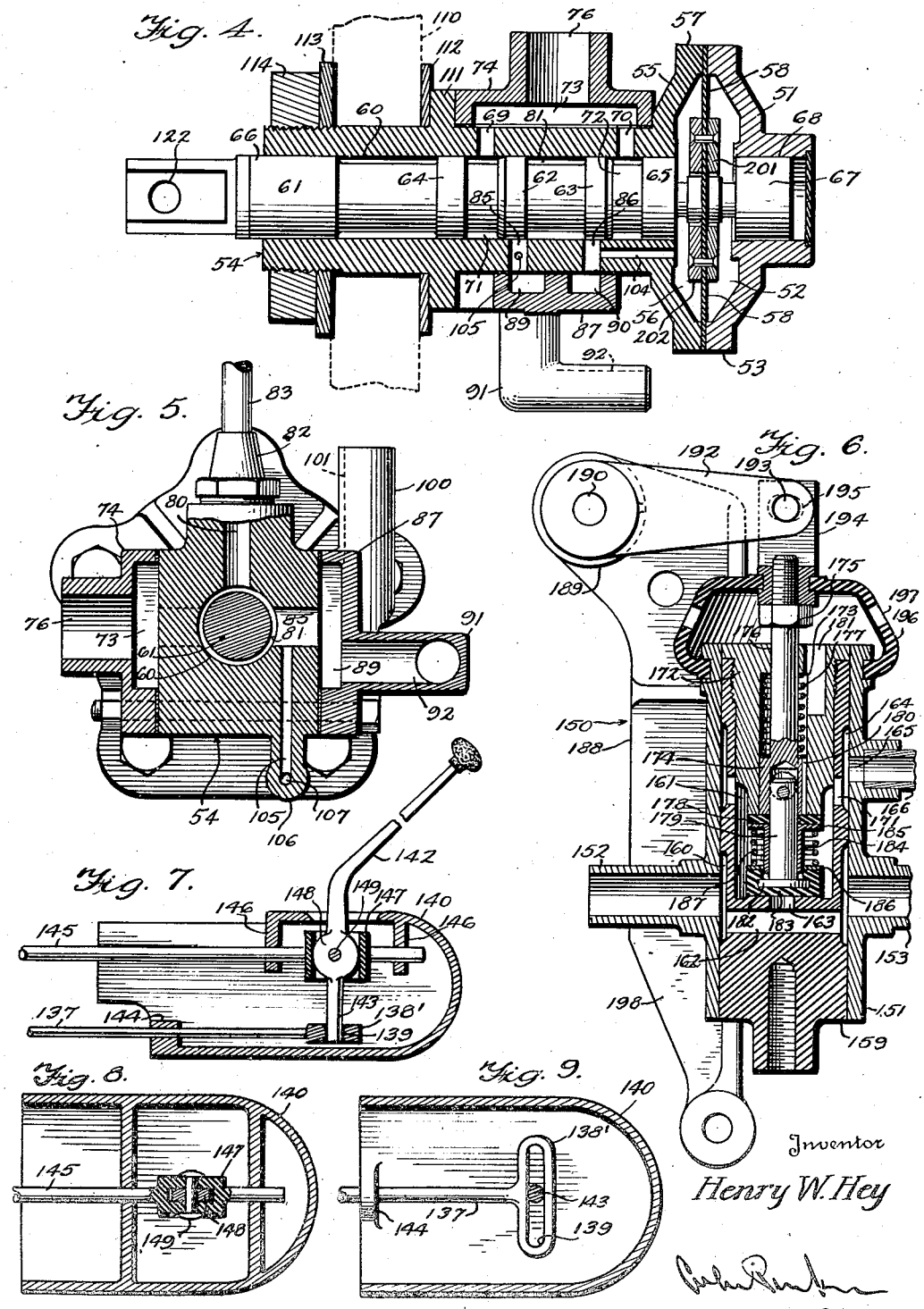
Inventor
Henry W. Hey
Attorney

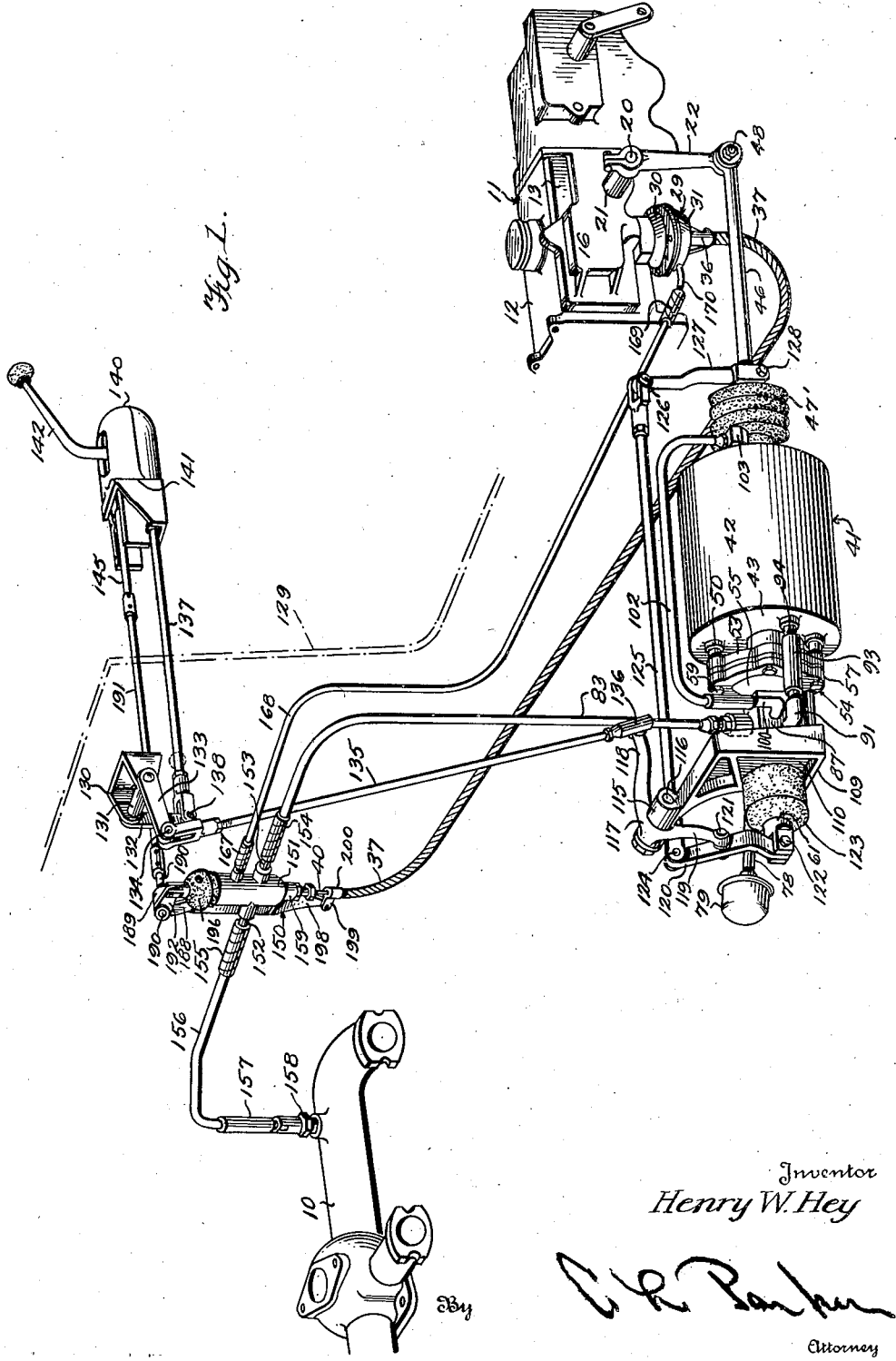
May 21, 1940.  H. W. HEY  2,201,971
GEAR SHIFTING MECHANISM
Filed Oct. 15, 1937   4 Sheets-Sheet 1
Inventor
Henry W. Hey
By
Attorney

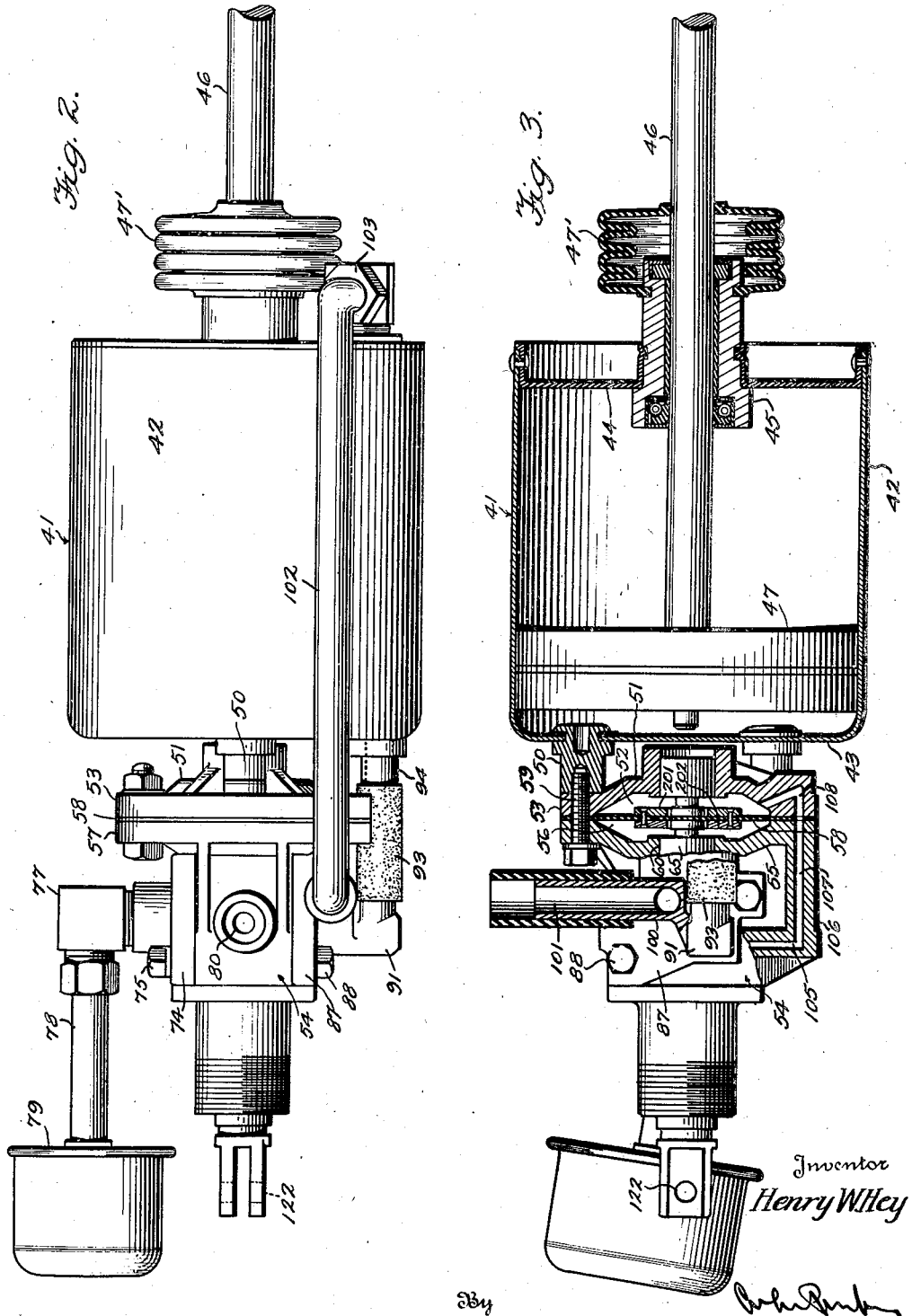

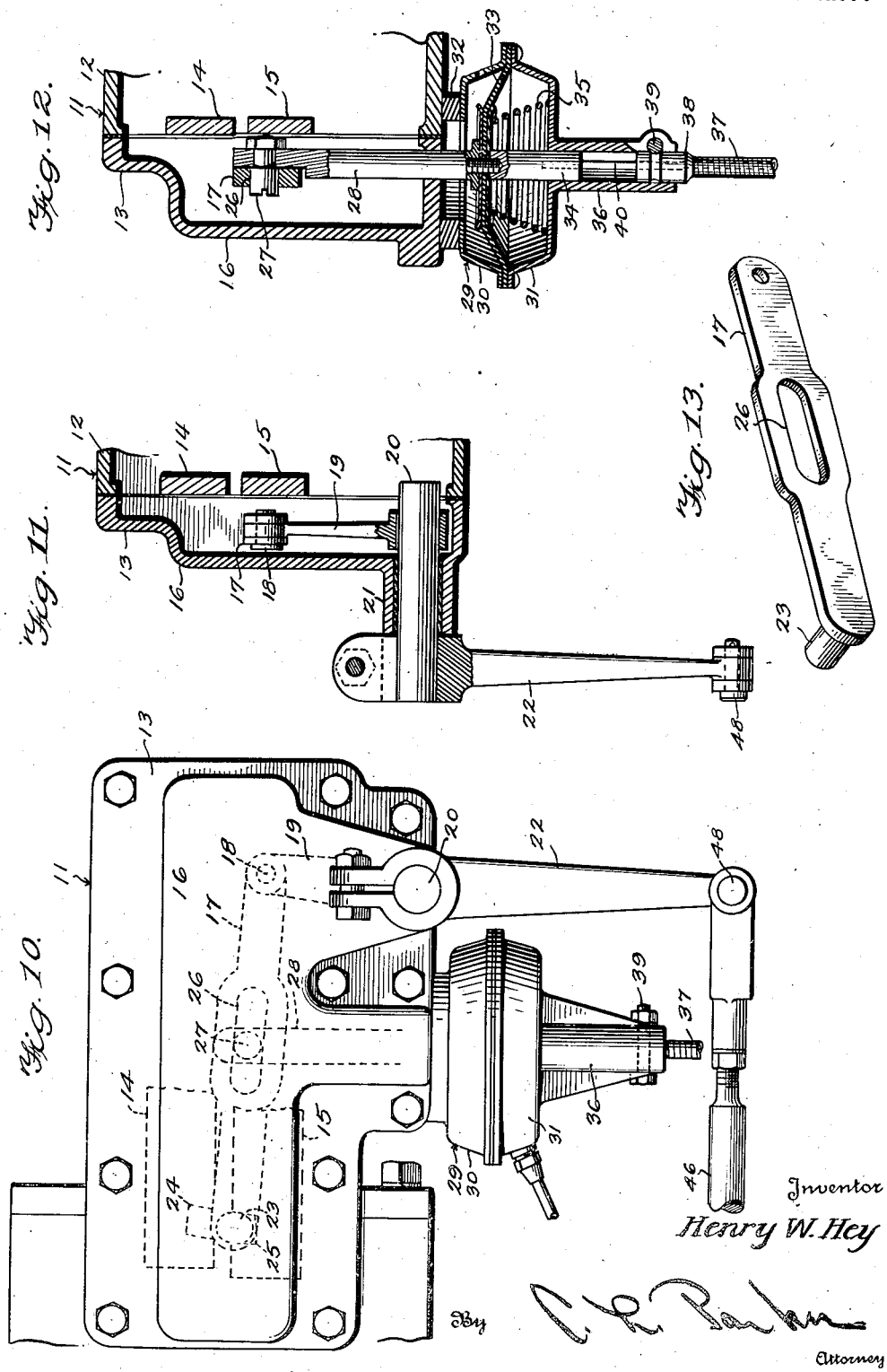

Patented May 21, 1940

2,201,971

UNITED STATES PATENT OFFICE 2,201,971

GEAR SHIFTING MECHANISM

Henry W. Hey, Richmond, Va., assignor to Automatic Shifters, Inc., Richmond, Va., a corporation of Virginia Application October 15, 1937, Serial No. 169,288

34 Claims. (Cl. 74—335)

This invention relates to gear shifting mechanisms and more particularly to vacuum operated motor vehicle gear shifting mechanisms of the type disclosed in my copending application Serial No. 162,051, filed September 1, 1937.

In the copending application referred to I have disclosed a vacuum operated motor connected to shift either of the shift rails of the motor vehicle transmission, and such motor is controlled by a follow-up valve mechanism whereby the shifting operation takes place in accordance with the movement of a manually operable handle connected to the valve mechanism. The follow-up valve mechanism is arranged wholly separate from the shifting motor and comprises two movable elements one of which is connected to be operated by the manually operable lever and the other of which moves in accordance with the shifting operation to provide the follow-up action referred to. The ports of the valve mechanism are constructed and arranged to vacuum suspend the piston of the shifting motor in any position in which the manually operable lever is stopped, thus preparing the motor for instantaneous operation upon movement of the manual lever.

The mechanism of the copending application referred to is shown connected to a conventional motor vehicle transmission which is arranged in the customary manner with the shift rails lying in a horizontal plane at the top of the transmission. The prior mechanism contemplates the use of a crossover motor connected to a selecting element movable in a horizontal plane to select either of the shift rails for operation upon actuation of the shifting motor.

An important object of the present invention is to provide a shifting mechanism operating in accordance with the principles of the mechanism shown in the copending application referred to, but wherein only one of the main valve elements is movable and is operable by the manual selector handle to energize the motor, the same valve element being movable in accordance with the shifting operation to tend to restore it to its normal position, thereby providing a follow-up action whereby the shifting operation takes place in accordance with the movement of the manual lever.

A further object is to provide a shifting mechanism of the character referred to wherein the second valve element of the main valve mechanism is fixed with respect to the shifting motor and supports one end thereof through the medium of elastic means which permits the other end of the motor to alter its position incident to movement of the shift lever and incident to relative movement of the vehicle power plant with respect to the chassis.

A further object is to provide a shifting mechanism of the character referred to in combination with a conventional transmission which is "rolled over" or turned on its side approximately 90 degrees from the usual position of such a transmission whereby the floor boards of the vehicle may be substantially lowered.

A further object is to provide a shifting mechanism controlled by a follow-up valve action as in the co-pending application referred to, and to provide in conjunction therewith means for reacting against the manual lever in accordance with the degree of resistance encountered in the shifting operation thus providing the manual lever with "feel" to accurately simulate conventional gear shifting.

A further object is to provide a fluid pressure operated device responsive to pressures in the shifting motor and connected to react against the manual lever to provide the latter with the highly desirable "feel" referred to.

A further object is to provide a power shifting mechanism wherein "feel" is provided in the manually operable lever by offering resistance to the movement of such lever, and wherein the force exerted by the operator in overcoming such resistance is utilized for assisting the shifting motor in performing the shifting movement.

A further object is to provide control means for the shifting motor including the "feel" means referred to and to provide normally inoperative instrumentalities affording motion transmitting means through which manual shifting may be effected in the event of failure of the shifting motor, the "feel" means tending to prevent the functioning of such motion transmitting instrumentalities during the normal operation of the apparatus and being rendered inoperative upon failure of the power means to permit manual shifting to be more readily effected.

A further object is to provide a transmission shifting mechanism in which a small predetermined portion of the work of shifting is performed by the operator in acting against the "feel" in the manual lever and the remainder of the work is done by the shifting motor, while, upon failure of power or of the shifting motor, all of the work may be done by the operator through the same manual handle.

A further object is to provide a mechanism of this character wherein compactness is provided by mounting as a unit the shifting motor, the main control valve therefor, the means for transmitting a manual movement to the movable control valve and the means for providing the follow-up action of such control valve upon operation of the shifting motor.

A further object is to provide a crossover mechanism including a motor for selecting the shift rails for operation, and to provide in conjunction with the crossover mechanism a manually operable mechanism which is adapted to function upon failure of power in the crossover motor to provide selection of the shift rails.

A further object is to provide such a mechanism wherein the means for effecting the manual crossover action functions to prevent lateral movement of the manual lever except when the shift rails are in neutral position, thus eliminating the necessity for a gate or similar means for guiding the manual lever in an H-path.

A further object is to provide a fluid pressure operated crossover motor having a follow-up valve mechanism operated from the manual lever, the follow-up action of such valve mechanism being provided through the medium of the means which effects the manual crossover action upon a failure of power in the crossover motor.

Other objects and advantages of the invention will become apparent during the course of the following description.

In the drawings I have shown one embodiment of the invention. In this showing:

Figure 1 is a perspective view of the mechanism associated with parts of a motor vehicle, Figure 2 is a plan view of the shifting motor and the main valve mechanism and associated parts, Figure 3 is a section taken substantially on line 3—3 of Figure 2, parts being shown in elevation, Figure 4 is a horizontal sectional view through the valve mechanism separated from the shifting motor and taken substantially on line 4—4 of Figure 3, parts being shown in elevation, Figure 5 is a transverse vertical sectional view of the valve mechanism taken substantially on line 5—5 of Figure 4, Figure 6 is a central vertical sectional view through the crossover valve mechanism taken substantially as indicated by the line 6—6 in Figure 1, Figure 7 is a vertical sectional view of the control lever mechanism taken substantially as indicated by the line 7—7 of Figure 1, Figure 8 is a horizontal fragmentary sectional view on line 8—8 of Figure 7, Figure 9 is a similar view taken on line 9—9 of Figure 7, Figure 10 is a side elevation of a portion of the transmission, Figure 11 is a vertical sectional view on line 11—11 of Figure 10, Figure 12 is a similar view on line 12—12 of Figure 10, and, Figure 13 is a perspective view of the shift link.

Referring to Figure 1 the numeral 10 designates the intake manifold of a motor vehicle engine (not shown) and power is transmitted to the driving wheels of the vehicle through a transmission 11. This transmission is conventional in construction but is "rolled over" or turned on its side 90 degrees from its usual position. As shown in Figures 1, 10, 11 and 12, therefore, the transmission includes the usual casing 12 but the casing is open at its side instead of at the top and is provided with a side cover plate 13. Moreover, the shift rails 14 and 15 of the transmission lie in a vertical plane toward the side of the transmission instead of in a horizontal plane as in the conventional transmission arrangement.

The cover plate 13 has a relatively deep portion 16 extending substantially throughout the length thereof to receive a shift link 17. One end of this link is pivotally connected as at 18 to the upper end of a crank 19 carried by a shaft 20. This shaft extends through a suitable bearing 21 formed integral with the cover plate 16. The shaft 20 extends outwardly beyond the bearing 21 for connection with the upper end of a crank arm 22 to which power is supplied to move the link 17 and shift one of the shift rails 14 or 15 in a manner to be described.

At its other end, the shift link 17 is provided with an inwardly projecting finger 23 (Figures 10 and 13) and this finger is movable for selective engagement with notches 24 and 25 formed in the respective shift rails 14 and 15. Upon swinging movement of the crank arm 19, the shift link 17 will be moved longitudinally to transmit movement to one of the shift rails, depending upon the notch 24 or 25 in which the finger 23 is arranged.

The link 17 is swung vertically about the pivot 18 by the mechanism shown in Figures 10 and 12 to arrange the finger 23 in the selected notch 24 or 25. The link 17 is provided intermediate its ends with a slot 26 receiving a pivot pin 27 carried by the upper end of a reciprocating rod 28. It will be apparent that when this rod is moved upwardly the finger 23 will engage the notch 24, while the finger 23 will engage the notch 25 upon downward movement of the rod 28.

Movement of this rod is effected through a crossover motor indicated as a whole by the numeral 29. This crossover motor comprises upper and lower casing sections 30 and 31, the former of which carries a ring 32 secured against the bottom of the casing 13. A diaphragm 33 has its peripheral portion clamped between the peripheral flanges of the casing sections 30 and 31. The lower end of the rod 28 extends through the diaphragm 33 and has threaded or other connection with a vertically movable rod 34 arranged below the diaphragm 33. It will be apparent that the diaphragm is fixed with respect to both of the rods 28 and 34, and a spring 35 urges the diaphragm upwardly. This spring, therefore, constitutes means for urging the rod 28 upwardly thereby biasing the finger 23 toward the shift rail 14 whereby it will tend to move into the notch 24 when the shift rails are in the neutral position shown in Figure 10.

The casing section 31 is provided with a bearing 36 in which the rod 34 is slidable. A flexible tube 37 is provided with a ferrule 38 at its end extending into the bottom of the bearing 36 and secured thereto as at 39. The flexible tube 37 houses a Bowden wire 40 secured at its end to the rod 34. The functions of the wire 40 will be referred to in detail later.

A fluid pressure motor indicated as a whole by the numeral 41 is adapted to shift the selected transmission shift rail. This motor comprises a cylinder 42 having one end closed to provide a head 43 to which the main valve mechanism for controlling the motor is secured in a manner to be described. The other end of the cylinder 42 is provided with a head 44 carrying a bearing 45 in which a piston rod 46 is reciprocable, a piston 47 being connected to the piston rod 46 to form the pressure responsive member of the motor 41. A rubber or other flexible boot 47' is connected between the bearing 45 and piston rod 46 to seal the bearing 45 against dirt and other foreign materials. The other end of the piston rod 46 is pivotally connected as at 48 to the lower end of the lever 22.

As stated, the cylinder head 43 carries the main valve mechanism which controls the motor 41. The head 43 is provided with a plurality of circumferentially spaced studs 50 to form attaching means for the valve mechanism. Such mechanism comprises a casing member 51 having a chamber 52 formed therewithin, the casing member being provided with an annular flange 53 seating against the studs 50. The valve mechanism further comprises a body portion indicated as a whole by the numeral 54 provided at one end with a casing member 55 forming a chamber 56 similar to the chamber 52. The casing member 55 is provided with an annular flange 57 arranged adjacent the flange 53. A flexible diaphragm 58 is arranged between the flanges 53 and 57 as shown in Figures 3 and 4. Screws 59 extend through the flange 57, diaphragm 58 and flange 53, the inner ends of the screws being threaded in the studs 50. Thus it will be apparent that the casing 51 and the main valve body 54 are securely fixed with respect to the motor cylinder 42.

The valve body 54 is provided with a bore 60 in which is arranged a valve 61. Intermediate its ends, this valve is provided with a pair of spaced heads 62 and 63 the remote ends of which are preferably tapered as shown. The valve 61 is also provided with heads 64 and 65 spaced beyond the remote faces of the respective heads 62 and 63. Adjacent its ends, the valve 61 is provided with cylindrical portions 66 and 67 the former of which is slidable in the bore 60 and the latter of which is slidable in a bore 68 formed in the casing member 51.

At one side, the valve body 54 is provided with a pair of ports 69 and 70 the former of which communicates with the space 71 between the heads 62 and 64 and the latter of which communicates with the space 72 between the heads 63 and 65. Both of the ports 69 and 70 are in constant communication with a passage 73 formed in a manifold element 74 bolted as at 75 (Figure 2) to the valve body 54. The manifold element 74 is provided with a port 76 communicating through an elbow 77 and pipe 78 with an air cleaner 79. It will be apparent that both of the ports 69 and 70, therefore, and consequently the valve spaces 71 and 72 are in constant communication with the atmosphere.

The top of the valve body 54 is provided with a passage 80 communicating with the space 81 between the valve heads 62 and 63. The passage 80 is connected by a suitable union 82 to a pipe 83 which is in constant comunication with the intake manifold 10 in a manner to be described, regardless of the position of the valve 61.

As shown in Figure 4, the valve body 54 is provided with a pair of passages 85 and 86 through which pressures in opposite ends of the motor cylinder 42 are controlled in a manner to be described. It is particularly noted that the inner limits of the valve heads 62 and 63 are spaced apart a distance slightly greater than the distance between the inner limits of the ports 85 and 86. When the valve 61 is in the neutral position shown in Figure 4, therefore, both ports 85 and 86 have limited communication with the valve space 81 which is in constant communication with the intake manifold as previously stated.

A manifold element 87 is secured against one side of the valve body 54 as at 88 and is provided with passages 89 and 90 which communicate with the respective ports 85 and 86. An elbow 91 is formed integral with the manifold element 87 and is provided with a passage 92 (Figure 5) communicating with the passage 89. The elbow 91 has its outer end connected by a flexible hose 93 to a tubular member 94 leading into the adjacent end of the motor cylinder 42. It will be apparent, therefore, that the pressure in the port 85 (Figure 4) determines the pressure in the adjacent end of the motor cylinder 42.

The manifold element 87 is further provided with an integral elbow 100 (Figures 3 and 5) having a passage 101 communicating with the passage 90. The elbow 101 has its free end preferably turned upwardly as indicated in Figure 3 for connection with one end of a tubular member 102, the other end of this tubular member communicating with the remote end of the cylinder 42 through a suitable connection 103 (Figures 1 and 2).

The diaphragm chambers 52 and 56 are subject to the pressures existing in the respective ends of the cylinder 42 whereby differential pressures on opposite sides of the diaphragm 58 will resist movement of the valve 61 in accordance with the differential pressures on opposite sides of the motor piston 47. Referring to Figure 4, it will be noted that a passage 104 is drilled in the valve body 54 to afford communication between the passage 86 and the diaphragm chamber 56. Referring to Figure 5, it will be noted that the valve body 54 is provided with a passage 105 communicating at its upper end with the port 85. The valve body is provided with an integral projection 106 having a passage 107 (Figure 3) communicating at one end with the passage 105. The casing section 51 is drilled to provide a passage 108 affording communication between the passage 107 and the diaphragm chamber 52. Thus it will be apparent that the diaphragm chambers 52 and 56 communicate respectively with the ports 85 and 86, and these ports communicate respectively with the left and right ends respectively of the cylinder 42 as viewed in Figure 3.

A supporting bracket 109 is fixed in any suitable manner with respect to the frame of the vehicle and is provided with a resilient supporting block 110, preferably formed of rubber, fixed with respect thereto. The valve body 54 is supported with respect to the block 110 while the motor 41 is fixed with respect to the valve body 54. Therefore, the rubber block 110 forms a resilient support for one end of the motor-valve unit, and this arrangement permits the right hand end of the motor 41 as viewed in Figure 1 to alter its position incident to the swinging movement of the arm 22. The rubber mounting 110 also permits the motor vehicle engine to swing in its resilient support with respect to the vehicle body.

Any suitable means may be employed for securing the valve body 54 to its rubber mounting. In Figure 4 of the drawings the valve body has been indicated as being provided with an integral flange 111 against which is arranged a washer 112 which is adapted to engage one side of the rubber block 110. A similar washer 113 engages the other side of the rubber block, and the free end of the valve body is threaded to be received in a nut 114 adapted to be turned up against the washer 113.

As shown in Figure 1, the bracket 109 carries a boss 115 to which is connected to pivot pin 116. This pivot pin supports a bell crank lever 117 having arms 118 and 119. A floating lever 120 is pivotally connected intermediate its ends as at 121 to the lever arm 119 and the lower end of the lever 120 is pivotally connected as at 122 to the free end of the valve 61. If desired, a boot 123 may be connected between the rubber mounting 110 and the valve 61 inwardly of the pivot pin 122, as shown in Figure 1, to prevent the entrance of foreign material into the valve body 54.

The upper end of the floating lever 120 is pivotally connected as at 124 to a control link 125. The rear end of this link is pivotally connected as at 126 to an upper end of an arm 127 having its lower end clamped to the piston rod 46 by means of a screw 128. It will become apparent that the rocking movement of the lever arm 118 will swing the lever 120 about the pivot pin 124 to slide the valve 61 longitudinally, and that the resultant operation of the motor 41 will cause motion to be transmitted from the piston rod 46 through the link 125 to move the upper end of the lever 120 about the pivot pin 121 to tend to return the valve 61 to its normal position. This operation provides a follow-up action of the valve mechanism to cause the motor piston 47 to move in accordance with the movement of a manually operable handle to be described.

The dash 129 of the vehicle is provided with a bracket 130 supporting a shaft 131 to the respective ends of which are connected a substantially vertical crank arm 132 and the substantially horizontal crank arm 133. The end of the crank arm 133 is pivotally connected as at 134 to the upper end of a rod 135, and a connection 136 is provided between the lower end of this rod and the free end of the arm 118, this connection preferably being of the conventional ball and socket type.

An operating rod 137 extends through the dash 129 and has its forward end pivotally connected as at 138 to the lower end of the crank 132. The rear end of the rod 137, as shown in Figures 7 and 9, is provided with a transversely elongated head 138′ having a slot 139 formed therein. The head 138′ is arranged within a relatively short casing 140 shouldered as at 141 for reception in a suitable opening in the instrument panel (not shown) of the vehicle.

A manually operable lever 142 has its lower end 143 arranged in the slot 139. The lever 142 is transversely movable to select the respective transmission shift rails for operation in a manner to be described and corresponding movement of the lower end 143 of the lever takes place freely in the slot 139. Upon forward and rearward movement of the handle 142, however, movement will be transmitted to the rod 137 and this movement is utilized for operating the control valve 61 through the mechanism described. The rod 137 preferably extends through a suitable guide 144 carried by the housing 140.

Operation of the crossover motor 29 is controlled by a rock shaft 145 (Figures 1, 7 and 8) mounted in suitable bearings 146 arranged within the housing 140. Between these bearings, the rod 145 is provided with a head 147 through which the lever 142 extends. The portion of the lever 142 within the head 147 is enlarged as at 148 and is pivotally connected as at 149 to the head 147. Upon forward and rearward movement, the lever 142 pivots about the pin 149, and upon transverse movement of the lever 142, the enlarged portion 148 of the lever transmits rocking movement to the shaft 145 through the head 147.

A crossover valve indicated as a whole by the numeral 150 is operated upon rocking movement of the shaft 145 and controls the crossover motor 29. The valve 150 is preferably carried by the dash 129 and is shown in detail in Figure 6 of the drawings. The valve 150 comprises a vertical cylindrical valve body 151 having opposite sides provided with aligned tubular projections 152 and 153, the latter of which is connected to the pipe 83 preferably by a flexible tubing section 154, as shown in Figure 1. The tubular projection 152 is preferably connected by a similar flexible tubular section 155 to one end of a tube 156, the other end of this tube being connected by a flexible section 157 to a union 158 tapped into the intake manifold 10.

A valve member 159 is vertically slidable in the valve body 151 and is provided with a reduced portion 160 in constant communication with the tubular projections 152 and 153. Therefore, the valve 159 does not disturb communication between the pipes 83 and 156, and the valve space 81 (Figures 4 and 5) is therefore in constant communication with the intake manifold. The upper end of the valve 159 is hollow as indicated by the numeral 161. The solid lower end of the valve 159 is provided with a diametrical passage 162 in constant communication with the intake manifold through the tubular extension 152, and above this passage a port 163 is adapted to afford communication between the passage 162 and the interior of the hollow upper end of the valve 159.

The valve 159 is provided above the reduced portion 160 with a similar reduced portion 164 forming a space communicating in any position of the valve 159 with a port 165. A nipple 166 has one end communicating with the port 165 and the other end of this nipple is connected by a flexible tubular section 167 (Figure 1) with one end of a pipe 168. The other end of this pipe is connected by a flexible tubular section 169 with a short pipe section 170 communicating with the lower casing section 31 of the crossover motor 29. The valve 159 is provided with ports 171 affording communication between the space 161 and the port 165 around the reduced portion 164 of the valve.

A plug 172 is threaded in the upper end of the valve 159. This plug is provided with a bore 173 in which is slidable a head 174 carried by a reduced upwardly extending stem 175. The upper end of the bore 173 is reduced as at 176 to form a bearing for the reduced stem 175. A spring 177 urges the head 174 downwardly.

A valve member 178, preferably formed of rubber, seats against the lower end of the plug 172 and surrounds a stem 179 having its upper end arranged within and secured to the head 174. As shown, the head 174 is provided with a groove 180 communicating with the space above the head 174, and the upper end of the plug 172 is provided with an opening 181 affording communication between the upper end of the bore 173 and the space above the valve body. Thus the unseating of the valve 178 will admit atmospheric pressure into the space 161.

The lower end of the stem 179 is provided with an outstanding flange 182 carrying a rubber or similar elastic valve member 183 adapted to seat on the bottom of the space 161 to form a closure for the opening 163. A ferrule 184 surrounds the stem 179 between the valves 178 and 183 and is provided at its upper end with an outstanding flange 185 seating against the bottom of the valve 178. A washer 186 seats upon the top of the valve 183 and a coil spring 187 is arranged between the flange 185 and washer 186 to urge these members away from each other and thus urge the valves 178 and 183 toward their seats. The two rubber valves referred to are highly elastic, and upon downward movement of the head 174, corresponding downward movement of the stem 179 will compress the valve 183 while the head 174 moves the valve 178 off its seat whereby the passage 180 will communicate at its lower end with the space 161, thus connecting the lower casing of the crossover motor to the atmosphere. Upon upward movement of the head 174, the valve 178 will be compressed against its seat thus permitting sufficient upward movement of the flange 182 to lift the valve 183 from its seat. Thus the space 161 will communicate with the vacuum passage 162 through port 163, and air will be exhausted from the lower casing section of the crossover motor. The Bowden wire 40 is connected to the bottom of the valve 159 and one of the functions of this wire, as will be described, is to cause the valve 159 to move in a follow-up action with respect to the head 174, whenever one of the valves 178 or 183 is unseated to cause operation of the crossover motor.

The valve body 151 is provided with a preferably integral bracket 188 which may be utilized for securing the crossover valve to the dash 129. The bracket 188 is provided at its upper end with a bearing 189 supporting a shaft 190, and this shaft is coupled to the rock shaft 145 (Figure 1) by a shaft section 191. Accordingly transverse movement of the manual lever 142 will rock the shaft 190.

A crank 192 is secured at one end of the shaft 190 and has its free end pivotally connected as at 193 to a yoke 194 to which the upper end of the stem 175 is connected. The pivotal connection of the pin 193 with the yoke 194 is provided with sufficient lost motion by means of a slot 195 to permit the stem 175 to partake of linear movement while the crank 192 swings about the axis of the shaft 190. A preferably rubber boot 196 is connected between the yoke 194 and the upper end of the valve body 151 to minimize the entrance of dirt or other foreign material into the valve, and this boot is ported as at 197 to maintain the passage 181 vented to the atmosphere.

The lower end of the bracket is provided with a depending portion 198 carrying a small bracket 199 having a circular end 200 (Figure 1) receiving and supporting the upper end of the flexible housing 37.

The apparatus is preferably provided with means for permitting the manual operation of the shift rails in the event of power failure in the motor 41. This feature also is described and claimed in my copending application referred to above, but is even more effective in connection with the present apparatus for reasons which will be referred to later. For the purpose of permitting such manual operation, means is preferably provided for limiting the movement of the valve 61 with respect to the valve casing 54. For example, the diaphragm 58 may be provided on opposite sides thereof with relatively heavy disks 201 and 202 preferably formed of an internal diameter slightly greater than the diameter of the adjacent portion of the valve 61 to limit elasticity between the valve and the disks 201 and 202. These disks are adapted to contact with adjacent portions of the housings 51 and 55 when the motor 41 fails to function upon movement of the valve 61, and the valve is moved somewhat beyond its normal operative position.

The operation of the apparatus is as follows:

Assuming that the transmission is in neutral prior to starting the vehicle from a standstill, atmospheric pressure will be present in the lower crossover motor casing 31, in which case the diaphragm 33 and rod 28 will be biased to their upper positions as shown in Figure 12. Accordingly the pin 23 will be in engagement with the notch 24 of the first and reverse gear shift rail 14. Accordingly the vehicle is ready to be started in low gear.

Under the foregoing conditions, it will be apparent that the manually operable lever 142 also will be in neutral position, whereupon the driver may start the vehicle in motion by moving the lever 142 toward the left and rearwardly as viewed by the operator, in accordance with the conventional movement of a gear shift lever. In this connection, it will be noted that the perspective view in Figure 1 is taken looking rearwardly from the right hand side of the vehicle and accordingly the lateral movement of the handle 142 will be toward the right as viewed in Figure 1.

Upon rearward movement of the lever 142, this lever will pivot about the axis of the pin 149, thus moving the lower end 143 of the lever forwardly or to the left as viewed in Figure 7. This operation pushes the rod 137 forwardly or to the left as viewed in Figures 1 and 7, and thus the crank 132, shaft 131 and crank 133 will be turned in a clockwise direction (Figure 1). Accordingly, the rod 135 will be pulled upwardly to swing the bell crank lever 117 in a counter-clockwise direction, and accordingly the lever arm 119 will transmit movement to the lever 120 to turn this member in a counter-clockwise direction about the pivot pin 124. It will be apparent that since the motor 41 has not yet been operated the rod 125 will be stationary, thus fixing the position of the pivot pin 124 whereby movement will be imparted to the lever 120 in the manner referred to to move the valve 61 toward the right as viewed in Figures 1 and 4.

Very slight initial movement of the valve 61 will cause the head 62 to move a sufficient distance to close the port 85 to the space 81 and to open it to the space 71. At the same time, the head 63 will move to uncover the port 86 to a slightly greater extent than shown in Figure 4, thus increasing communication between this port and the vacuum space 81. Under such conditions, therefore, the port 85 and passage 89 will be open to the atmosphere through port 69, while the port 86 and passage 90 will be connected to the intake manifold through port 80 (Figure 5) and pipe 83. Since the passage 86 will have been previously in limited communication with the intake manifold, air will have been exhausted from the diaphragm chamber 56 through port 104, and since the passage 90 communicates with the right hand end of the motor cylinder 42 through pipe 102 (Figure 1) it will be apparent that air will have been previously exhausted from such end of the cylinder.

Since the port 85 and passage 89 are now connected to the atmosphere it will be apparent that air will flow through passages 105, 107 and 108 (Figures 3 and 5) into the diaphragm chamber 52. It also will be apparent that air will flow from the passage 89 through the elbow 91 and tube 93 to the left hand end of the motor cylinder 42, and thus a differential pressure will be built up on opposite sides of the piston 47 to move this member toward the right as viewed in Figures 1 and 3. Accordingly similar movement will be transmitted to the piston rod 46 to swing the crank arm 22 in a counter-clockwise direction as viewed in Figure 1. Since the crank 22 is connected through the shaft 20 to the crank 19 as shown in Figures 10 and 11, it will be apparent that the latter crank will move the shift link 17 toward the left and transmit similar movement to the shift rail 14 to move the latter toward low gear position.

The operation of the motor piston 47 and piston rod 46 in the manner referred to moves the rod 125 toward the right as viewed in Figure 1. Assuming that the manual lever 142 has been moved only a short distance and its movement arrested, the stopping of the movement of this lever will arrest movement of the bell crank arm 119 and pivot pin 121. Accordingly movement of the rod 125 will cause the floating lever 120 to turn in a clockwise direction about the pivot pin 121, thus moving the valve 61 toward the left as viewed in Figures 1 and 4. This movement of the valve 61 will be opposite to that previously imparted upon movement of the manual lever 142, and accordingly the valve 61 will be restored to the position shown in Figure 4. Under such conditions, the valve heads 62 and 63 (Figure 4) will move to the neutral position wherein both ports 85 and 86 will have limited communication with the vacuum space 81. Thus air will be exhausted from the diaphragm chamber 52 through passages 105, 107 and 108 (Figure 3) and air will be similarly exhausted from the left hand end of the motor cylinder 42 through elbow 91 and pipe 93. Thus equalized partial vacuum will exist on opposite sides of the diaphragm 58 and on opposite sides of the motor piston 47 and movement of the motor piston will be arrested.

The foregoing operation has been set forth merely to indicate that whatever movement is transmitted to the manual lever 142 will result in the transmission of the corresponding movement to the motor piston 47. It also will be apparent that pressures existing on opposite sides of the motor piston will be reproduced on opposite sides of the diaphragm 58, and this feature is of great importance, as will be described later.

Normally, of course, the operator will continuously move the manual lever 142 from neutral position into the low gear position, and during such operation continuous movement of the bell crank lever 117 will take place and the pivot pin 121 obviously will continue to move rearwardly or to the right as viewed in Figure 1 so long as movement is transmitted thereto through the rod 135. Such operation, however, will not continuously move the valve 61 since operation of the piston 47 and piston rod 46 toward the right as viewed in Figure 1 will transmit continuous movement through the rod 125 to the pivot pin 124 to move this element rearwardly.

During continued movement of the handle 142, therefore, movement of the pivot pin 124 will compensate for movement of the pivot pin 121 and the valve 61 will remain in a position in which the port 86 (Figure 4) will remain in communication with the vacuum space 81 while the port 85 will be closed to the vacuum space 81 and maintained in communication with the atmosphere through the valve space 71, port 69, etc. It is the continued maintenance of the valve 61 in such position and continued movement of the manual lever 142 which causes the piston 47 to move continuously toward the right hand end of the cylinder 42 at which point the shift rail 14 will reach low gear position.

As soon as the shift rail 14 reaches low gear position, the valve 61 will reassume its neutral position with both of the ports 85 and 86 in restricted communication with the vacuum space 81 as shown in Figure 4. Any suitable means may be employed for permitting the motor piston 47 to travel the very slight distance beyond a corresponding gear position of the lever 142 to permit the neutral position of the valve to be reached. For example, movement of the handle 142 may be limited so as to limit movement of the valve 61 and thereby permit the motor piston 47 to travel a slight additional distance to move the selected shift rail fully into a gear position and such slight additional travel may be taken advantage of to permit the rod 125 to swing the lever 120 and thus return the valve 61 to neutral position. Means for limiting movement of the lever 142 may be of any desired form, as stated. For example, the lever may engage the ends of the slot in the casing 140 through which the lever projects.

However, the diaphragm 58 tends to return the valve 61 to neutral position and when the lever 142 reaches the low gear or any other gear position and is released, the elasticity of the diaphragm 58 will return the valve 61 to neutral position. The returning of the valve 61 to neutral position whenever movement of the lever 142 is arrested, for example in low gear position, provides an important feature of operation of the device. In the neutral position of the valve 61, it will be apparent that both ends of the motor cylinder 42 will communicate with the source of vacuum through the space 81 (Figure 4) and accordingly when the piston 47 reaches a gear position the returning of the valve 61 to neutral position results in exhausting air from the end of the cylinder 42 to which air previously had been admitted. For example, when the low gear position is reached the piston 47 will be at the right hand end of the cylinder 42, and as soon as the valve 61 returns to neutral position, air will be exhausted from the left hand end of the cylinder 42, thus balancing pressures on opposite sides of the piston 47.

This feature is of importance in securing instantaneous operation when the next gear shifting operation is initiated by moving the handle 142. For example, assuming the piston 47 to be in the low gear position referred to, movement of the lever 142 will admit atmospheric pressure into the right hand end of the cylinder 42 while maintaining the partial vacuum in the left hand end of the cylinder. This "dumping" of air into the right hand end of the cylinder causes instantaneous movement of the piston 47, the operation taking place much more rapidly than if the piston 47 were air balanced and air exhausted from the left hand end of the cylinder. This feature of "vacuum suspending" the piston 47 in any position in which movement of the lever 142 is stopped forms no part of the present invention per se but is described and claimed in my copending application Serial No. 162,051, filed September 1, 1937.

The shift may be made into second gear from the low gear position while moving the lever 142 forwardly to neutral position, then transversely to the right in neutral position, and then forwardly into the second gear position corresponding to the similar position of a conventional gear shift lever. Upon forward movement of the lever 142, the lower end 143 of this lever will move the rod 137 rearwardly or to the right as viewed in Figures 1 and 7, and accordingly the crank 132, shaft 131 and crank 133 will be turned in a counter-clockwise direction to move the rod 135 downwardly. This movement rocks the bell crank lever 117 in a clockwise direction whereupon the pivot pin 121 will move forwardly or to the left as viewed in Figure 1.

Since the piston 47 will have been at rest in the low gear position under the conditions referred to, the swinging of the bell crank lever 117 will turn the lever 120 in a clockwise direction about the pivot pin 124 thus moving the valve 61 toward the left as viewed in Figures 1 and 4. This operation causes the valve head 63 to close the port 86 to the vacuum space 81 and open it to the atmospheric space 72, while the valve head 62 will open the port 85 to a slightly greater degree of communication with the space 81. Through the connections described, the forward end of the cylinder 42 will remain in communication with the vacuum source while air will be "dumped" into the rear end of the cylinder. Thus the piston 47 will promptly move forwardly.

Forward movement of the piston transmits corresponding movement through the rod 125 to the pivot pin 124 to tend to turn the lever 120 about the pivot pin 121. Continued forward movement of the pin 121, however, upon continued forward movement of the lever 142, prevents the rod 125 from returning the valve 61 to its neutral position and this valve will remain in the operative position referred to to cause continued forward movement of the piston 47. As soon as neutral position of the lever 142 is reached, forward movement of the lever will be arrested preparatory to moving the lever transversely. As soon as movement of the lever 142 is stopped, forward movement of the rod 125 will swing the lever 120 about the pivot pin 121 to a sufficient degree to restore the valve 61 to its neutral position thereby vacuum suspending the piston 47 and arresting it at a position intermediate the position of the cylinder 42.

Forward movement of the piston 47 in the manner described swings the cranks 22 and 19 in a clockwise direction as viewed in Figure 10 and movement of the piston 47 will be arrested when the shift rail 14 reaches neutral position due to movement of the lever 142 having been stopped. The pin 23 will remain in the notch 24 pending transverse movement of the lever 142 to the second and high gear side. Such movement of the lever 142 will rock the shaft 145, thus transmitting similar movement to the crank 192 (Figures 1 and 6) to move the valve stem 175 upwardly. Under such conditions, the valve 178 will remain on its seat while the valve 183 will be lifted to connect the space 161 to the vacuum passage 162. Accordingly such operation connects the pipe 166 (Figure 6) and pipes 168 and 170 and the crossover motor casing 31 (Figure 1) to the source of vacuum. Since the upper motor casing 30 is vented to the atmosphere, the operation referred to establishes differential pressures on opposite sides of the diaphragm 33 thus moving this diaphragm downwardly to swing the link 17 and thus transfer the finger 23 from the notch 24 to the notch 25 of the second and high gear shift rail 15.

Selection of the second and high gear shift rail having been made, the lever 142 may be moved forwardly to effect the shift into second gear. So far as the shift motor 41 and its control mechanism is concerned, movement of the handle 142 from neutral into second gear position causes exactly the same functions to be performed as when the lever 142 is moved from the low gear position to neutral position, and the description of such operation need not be repeated. Air will be admitted into the rear end of the cylinder 42 and the piston 47, which previously had stopped in neutral position, will move toward the forward end of the cylinder 42. This movement is transmitted to the shift link 17 to move the shift rail 15 into second gear position. As soon as this position is reached, the valve 61 will be restored to neutral position and the piston 47 will be vacuum suspended with the gear set in second gear.

The shift into high gear may be made by moving the lever 142 in accordance with conventional practice, this lever being pulled directly rearwardly from its forward limit of movement to its rearward limit while being maintained at the second and high gear side. Such movement causes the lever 142 to rock about its pivot pin 149 (Figure 7) without rocking the shaft 145 on its axis, and no change will take place in the crossover valve mechanism shown in Figure 6. Accordingly the pin 23 of the shift link 17 will remain in engagement with the notch 25, and the shift rail 15 will be moved from the second to the high gear position. When such position is reached, the piston 47 again will be vacuum suspended as in the low gear position.

The shift into reverse gear may be made by moving the handle 142 to the left in neutral position and then forwardly to a position corresponding to the reverse gear position of a conventional shift lever. Assuming that the lever 142 previously has been at the second and high gear side, transverse movement of the lever 142 to the first and reverse gear side will reverse the previously described rocking of the shaft 145, and this movement will be transmitted to the crank 192 to move the stem 175 downwardly. This operation causes the lower stem 179 (Figure 6) to seat the valve 183 and close the vacuum port 163. The head 174, however, will unseat the valve 178, thus permitting air to flow through passage 181, through the upper end of the bore 173 and through passage 180, over the top of the valve 178 into the chamber 161. The air will then flow through ports 171 and the previously described piping connections leading to the lower casing of the crossover motor. Atmospheric pressure being present on both sides of the diaphragm 33, the spring 35 will force the diaphragm 33 upwardly, and movement will be transmitted to the shift link 17 to transfer the finger 23 to the notch 24.

Forward movement of the lever 142 from the neutral position into the reverse gear position will cause the motor 41 to operate in exactly the same manner as for the shift into second gear, and such operation need not be repeated. Since the shift pin 23 is in engagement with the notch 24, the low and reverse gear shift rail will be actuated and when the reverse gear position is reached, the motor piston 47 will be vacuum suspended in the same manner as for second gear.

While both valves 178 and 183 of the crossover valve device have been shown in Figure 6 as being in engagement with their seats, it will be apparent that such position is an intermediate position and that movement of the crank arm 192 will unseat one of the rubber valves referred to. Downward movement of the stem 175 unseats the valve 178, the slight movement for this purpose from the position shown in Figure 6 being permitted by the elasticity of the valve 183. Similarly, the elasticity of the valve 178 permits upward movement of the valve 183 a sufficient distance to open the port 163.

Attention is invited to the fact that a follow-up action is provided in the crossover valve mechanism 150 by virtue of the Bowden wire connection 40 between the valve 159 and the stem 34 of the crossover motor. Assuming that the lever 142 is moved transversely in neutral position from the first and reverse gear side to the second and high gear side, such action will pull the stems 175 and 179 upwardly (Figure 6) thus maintaining the atmospheric valve 178 on its seat while lifting the valve 183 to open the vacuum port 163. This action, of course, takes place upon initial transverse movement of the lever 142 and results in connecting the lower crossover motor casing 31 (Figure 12) to the intake manifold whereupon the diaphragm 33 will start to move downwardly. This motion of the diaphragm is transmitted through the Bowden wire 40 to the valve 59, thus causing it to move upwardly to provide a follow-up action with respect to the valve 183. So long as the transverse movement of the lever 142 is continued, the valve 183 will continue to move slightly in advance of its seat, and when the lever 142 reaches the second and high gear side, slight additional movement of the diaphragm 33 will act through the Bowden wire to move the valve 159 upwardly, thus causing the valve 183 to close the port 163.

In a similar manner a follow-up action is provided when transferring the lever from the second and high gear side to the first and reverse gear side. Upon the initiation of such action, vacuum will be present in the lower casing 31 of the crossover motor, the shift link 17 having its pin 23 in engagement with the notch 25 of the second and high gear shift rail 15. Upon initial transverse movement of the lever 142 toward the low gear side, the valve stems 175 and 179 will move downwardly, the compressibility of the valve 183 permitting the head 174 to move downwardly with the stem 179 a sufficient distance to permit the head 174 to unseat the valve 178. Under such conditions, the valve 183 will remain on its seat while air will be admitted through passage 180 into the chamber 161 and thence into the lower crossover motor casing 31.

The admission of air into the bottom of the crossover motor permits the spring 35 to start the upward movement of the diaphragm 33, and such movement is transmitted through the Bowden wire 40 to the valve 159 to move this valve downwardly. The seat of the valve 178 will follow slightly behind this valve during continued transverse movement of the lever 142, and during such period of operation air will be continuously admitted into the bottom of the crossover motor to permit the spring 35 to continue to move the diaphragm 33 upwardly. When the lever 142 reaches the low gear side, this movement will be arrested, whereupon slight further upward movement of the diaphragm 33 will move the valve 159 downwardly through the Bowden wire 40 to bring the seat of the valve 178 into contact with the top of this valve and thus close the air passage 180. At such time, it will be apparent that the finger 23 of the shift link will be fully in engagement with the notch 24 to prepare the low and reverse gear shift rail 14 for operation.

The Bowden wire 40 not only provides a follow-up action of the crossover valve mechanism but also provides means whereby manual selection of the shift rails may be provided upon a failure of power in the crossover motor. Assuming that for some reason the crossover motor fails to operate, the two valves 178 and 183 operate to provide a mechanical connection between the crank 192 and the Bowden wire 40 to transmit movement of the crank 192 to the diaphragm of the crossover motor. For example, if the lever 192 moves downwardly to select the low and reverse gear shift rail for operation and the crossover motor fails to function, the valve 183 will compress to a slight extent and will then positively move the valve 59 downwardly and transmit movement through the Bowden wire 40 to effect upward movement of the crossover motor shaft and thus provide manual selection of the first and reverse gear shift rail. Upon upward movement of the crank 192, and assuming that the crossover motor fails to operate, the valve 178 will compress slightly and then transmit upward movement to the plug 172 and thus to the valve 159, and this movement will be transmitted to the Bowden wire 40 to manually operate the crossover motor and select the second and high gear shift rail for operation. Upon a failure of power in the crossover motor, therefore, the operator is enabled to manually select either shift rail for operation.

The Bowden wire 40 also provides a third function in that it prevents the lever 142 from swinging back and forth between the low gear side and high gear side except when the shift rails are in the neutral position shown in Figure 10. It will be apparent that the rubber valves 178 and 183 provide quite limited lost motion between the head 174 and the valve 159, and accordingly neither of these elements can move more than a slight distance unless the other element follows such movement. The Bowden wire obviously cannot move unless the shift link 17 moves, and such link cannot swing vertically except when the two shift rails are in neutral position.

Therefore it will be apparent that the Bowden wire prevents movement of the valve 159 except when the shift rails are in neutral position, and accordingly the head 174 is adapted to partake of only slight movement except when the shift rails are in neutral. Since the lever 142 cannot be moved laterally without imparting movement to the head 174, no lateral movement of the handle can take place except when in neutral position. Accordingly the lever 142 can move only in a conventional H-path, and such path of movement of the lever 142 is provided without the use of so-called "gates" for defining an H-path for the lever.

The diaphragm 58 of the main valve mechanism and associated parts provides a highly advantageous feature of the present invention. It will be apparent that the present construction is not preselective in its operation, but on the contrary provides for the shifting of the gears upon movement of the lever 142 when the vehicle clutch is disengaged, thus simulating conventional gear shifting practice. In conventional practice the operator feels through the gear shift lever any resistance which is encountered by the gear shift lever and the elements connected thereto when any shifting movement is being effected. For example, the synchronizing devices of modern transmissions offer some resistance to the movement of a conventional gear shift lever.
This resistance is felt by the operator and accordingly the operator is enabled to retard the shifting operation at the synchronizing point to permit synchronization to take place.

The diaphragm 58 and associated elements provide the manual lever 142 with resistance which is directly proportionate to the resistance encountered by the shifting motor 42 in performing any shifting operation. Upon any movement of the main valve 61 from its neutral position, one end of the shifting motor will be maintained in communication with the intake manifold while air will be admitted into the other end. Upon the admission of air into one end of the motor 42 the differential pressure which will be built up on opposite sides of the piston 47 will depend upon the resistance encountered in performing the shifting operation. For example, when there is minimum resistance offered to the shifting action, the piston 47 will move freely with only slight differential pressure on opposite sides thereof, and the same slight differential pressure will exist on opposite sides of the diaphragm 58 due to the passages connecting the diaphragm chambers 52 and 56 with the respective passages 85 and 86, the latter passages being in communication respectively with the left and right hand ends of the cylinder 42 as viewed in Figure 3. The slight differential pressure on opposite sides of the diaphragm 58 under the conditions referred to provides a slight resistance against movement of the manual lever 142.

Assuming that movement of the piston 47 encounters increased resistance, as when the synchronizing means of the transmission comes into operation, such added resistance instantaneously retards movement of the piston 47 whereupon the admission of air into one end of the cylinder 42 increases the differential pressure on opposite sides of the piston to provide increased force for moving the piston against the increased resistance referred to. The increased differential pressure on opposite sides of the piston 47 is instantaneously established on opposite sides of the diaphragm 58, and accordingly resistance to the movement of the lever 142 will be instantaneously increased in proportion to the increased resistance against movement of the piston 47. Thus the operator is advised of any increase in the resistance offered to movement of the piston 47 and accordingly is enabled to effect the shifting action exactly in accordance with conventional practice. It will be apparent therefore, that the lever 142 is provided with "feel" as in a conventional gear shift lever and the operator is enabled to retard the shifting action during operation of the gear synchronizing means of the transmission to permit such means to properly function.

The present invention broadly comprehends the provision of "feel" in the manually operable lever 142 regardless of the relation of the "feel" providing means to any other features of the apparatus. However, it will be apparent from the foregoing description that the invention also contemplates the use of the force exerted by the operator's hand in overcoming resistance against movement of the handle 142 to perform useful work in assisting the shifting operation.

It will be noted that upon movement of the valve 61 in one direction, the differential pressures which will be built up on opposite sides of the diaphragm 58 will tend to move the valve 61 in the opposite direction. For example, when the valve 61 is moved to the right as viewed in Figure 4 upon movement of the lever 142 into first or high gear position, partial vacuum will be established in the chamber 56 while air will be admitted into the chamber 52 and thus the atmospheric pressure in the latter chamber will tend to move the valve 61 toward the left.

As previously stated, it is the differential pressure tending to oppose movement of the valve 61 which provides the lever 142 with "feel." Moreover, since the operator must overcome the differential pressures acting on the diaphragm 58 to move the valve 61 by transmitting force to the lever 120 intermediate its ends, the force exerted by the operator is not only transmitted to the valve 61 but also to the rod 125, thus assisting the motor 41 in moving the piston rod 46.

Accordingly it will be apparent that the operator provides part of the work delivered to the crank arm 22, and since differential pressures acting on the diaphragm 58, which must be overcome by the operator, correspond to differential pressures in the motor 41, the amount of work provided by the operator in any shifting operation is directly proportionate to the work performed by the motor 41.

Considering the theory of operation by which force is delivered through the rod 125 to the piston rod 46 in accordance with the force exerted by the operator against the lever 142, it will be apparent that from a slightly different aspect the "feel" device may be construed as a motor auxiliary to and connected in parallel with the motor 41. When differential pressures are provided on opposite sides of the diaphragm 58 as the result of movement of the lever 142, a force is transmitted through the valve 61 to tend to move the lower end of the lever 120. If the operator, having caused the "feel" device to exert the force referred to, should release the handle 142, no movement will be transmitted to the rod 125, the lever 120 merely pivoting about the pin 124.

On the other hand, the operator, after having moved the lever 142 and caused the "feel" device to come into operation, may continue the movement of the handle 142 under which conditions the force supplied through the valve 61 by the "feel" device will tend to move the lever 120 about both pivots 121 and 124. The operator, to continue the movement of the handle 142, must exert a force thereagainst equal to the force generated by the "feel" device, under which conditions the latter device functions as a motor to tend to turn the lever 120 about the pivot 124, thus transmitting force through the rod 125 to the piston rod 46 to assist the motor 41 in performing the shifting operation. Thus, under such theory of operation, the operator moves the lever 142 to provide at the pivot point 121 a reaction equal and opposite to the reaction provided at the pivot point 122 by the operation of the "feel" device.

In this connection, particular attention is invited to the fact that the handle 142 in its back and forth movement does not operate against springs or any other force tending to resist movement of the handle 142 except the resistance provided by the "feel" mechanism and the negligible friction of the mechanical connections, and it is for this reason that resistance to the movement of the handle 142 is always proportional to the resistance encountered in the shifting operation. For the same reason, the amount of work provided by the operator is proportional to the work performed by the motor 41.

The work performed by the operator is preferably a relatively small proportion of the work required for operating the crank arm 22, but is sufficient to permit the use of a smaller motor 41 than would be required if such motor performed all of the work in each shifting operation. Obviously the relation between the amount of work performed by the motor 41 and by the operator will depend upon several conditions in the embodiment of invention illustrated. For example, it will be dependent upon the relative effective areas of the diaphragm 58 and motor piston 47, and it will be dependent upon the relative lever lengths of the various connections between the lever 142 and the valve 61 and rod 125. Obviously, the relation between the work performed by the motor 41 and the operator may be predetermined by properly designing the parts referred to.

In other words, the relation of the effective area of the diaphragm 58 to the area of the piston 47 may be such that the "feel" device causes the expenditure of one-half as much work as the motor 41. Similarly, the various lever arms connected between the lever 142 and the valve 61 may be so designed as to further reduce the ratio of the work transmitted through the rod 125. The relationship between the elements and conditions determining the proportion of the work performed by the operator constitutes a mechanical advantage system which is highly flexible in design according to the demands of different motor vehicle manufacturers.

In my copending application Serial No. 162,051, referred to above, the two elements comprising the main valve mechanism for controlling the longitudinal shifting motor have their movement with respect to each other limited in order to provide means forming a direct mechanical connection whereby the operator is enabled to manually move the shift rails in the event of a failure in power in the shifting motor. This feature per se is claimed in the copending application referred to. The same general feature of operation is provided in the present construction and is rendered more efficient and practicable through the operation of the "feel" means described above.

Referring to Figures 1 and 4 it will be noted that the valve 61 moves only a relatively slight distance on opposite sides of its neutral position to energize the motor 41 and effect the shifting operation in accordance with the foregoing description. If the motor 41 fails to function in its intended manner, the valve 61 is adapted to partake of somewhat further movement away from its neutral position, and this movement will be limited by the disks 201 and 202. Under such conditions the operator may exert substantially greater than the normal amount of force against the lever 142 to effect a shift into a gear position.

Assuming that the operator desires to make a shift into low gear as when starting the vehicle, the operation previously described will take place, the handle 143 being moved to the left as viewed by the operator and then rearwardly whereupon movement will be transmitted to the valve 61 in the manner described to move this element to the right as viewed in Figures 1 and 4. If the motor 41 fails to function, movement of the handle 142 in the manner stated will cause the valve to move toward the right as viewed in Figure 4 until the disk 201 contacts with the adjacent portion of the housing 51, thus preventing further movement of the valve. Such movement will have been transmitted to the valve 61 by swinging movement of the bell crank lever 117 in a counter-clockwise direction, the pivot pin 121 thus moving toward the right as shown in Figure 1. When the valve 61 reaches its limit of movement referred to and force is applied to the lever 142 to move it rearwardly toward low gear position, this action will cause continued movement of the pivot pin 121 to the right as viewed in Figure 1, thus swinging the lever 120 about the pivot pin 122. This movement will be transmitted through the rod 125 to the piston rod 46 to swing the crank arm 22 and thus move the shift rail 14 into low gear position.

It will be apparent that either shift rail may be manually moved into either of its gear positions in the same manner when the motor 41 fails to function. From the foregoing description it will be apparent that the crossover valve 150 permits manual selection of either shift rail for operation, and the valve 61 has its movement limited in both directions. When either limit of movement of the valve 61 is reached, upon a given movement of the lever 142, continued movement of this lever will transmit movement to the rod 125 to swing the crank arm 22 in the same manner that it would have been swung if the motor 41 had functioned in its intended manner.

The motor 41 is so instantaneously responsive to movement of the valve 61 as to minimize the possibility that the operator may move the handle 142 sufficiently rapidly to cause the valve 61 to move to either limit of its movement before the motor 41 responds to the valve operation and effects the follow-up action through the rod 125. However, the use of the "feel" feature of the present construction in conjunction with the feature of providing manual actuation of the shift rails is highly advantageous in that it renders it substantially impossible for the operator to move the handle 142 in any shifting operation sufficiently rapidly to cause the valve 61 to move to either of its limits of movement. It will be noted that the application of differential pressures on opposite sides of the diaphragm 58 to provide the lever 142 with "feel" also acts to resist movement of the lever 142. Accordingly this handle is not completely freely movable, and when there is a minimum resistance to operation of the shifting motor the slight differential pressures built up on opposite sides of the diaphragm 58 provide the lever 142 with sufficient resistance, taken together with the instantaneous response of the motor 41 to operation of the valve 61, to prevent the operator from moving the lever 142 sufficiently rapidly to move the valve 61 to either limit of movement, except upon a failure of power in the motor 41.

In addition to the foregoing features, other advantages in construction and operation are inherent in the present apparatus. For example, the motor 41, the main valve mechanism and the operating and controlling means therefor are mounted as a single unit, thus facilitating the construction of the apparatus and providing an efficient operation. Moreover, it will be apparent that the valve housing 54 and diaphragm housing 51 are rigidly connected to one end of a motor cylinder 42 and form the sole means for supporting such member. The rubber block 110 provides a resilient support for the valve housing 54, thus permitting the motor 42 to partake of the vertical movement imparted thereto incident to the arcuate movement of the pivot pin 48.

Moreover, it will be apparent that the gear set is a unit with the power plant of the motor vehicle and in modern practice, a vehicle power plant is cushioned for movement in the vehicle frame. On the other hand, the rigid supporting bracket 109, the connections for operating the main valve, etc., are fixed with respect to the vehicle frame. Accordingly relative movement between the vehicle power plant and the frame must be compensated for, and the rubber mounting 110 provides this additional function. This mounting provides a universal support for the main valve housing 54 and accordingly for the forward end of the cylinder 42, thus permitting the rear end of this cylinder and the piston rod 46 to partake of all movements incident to the operation of the shifting apparatus and operation of the vehicle power plant.

In connection with the present application reference is made to applicant's prior Patent No. 2,180,330, issued November 14, 1939.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. The combination with a shiftable transmission operating member, of means for moving said shiftable member comprising a motor means for applying a force thereto, a manually movable control member accessible to the operator and connected to control the energization of said motor means, and means responsive solely to energization of said motor resulting from movement of said control member for applying a smaller and substantially proportional force to said control member opposing all movements thereof from any position simultaneously with the application of said first mentioned force, whereby the operator always will feel a resistance to movement of the control member substantially proportional to the resistance encountered by said shiftable member, said last named means being constructed and arranged to be inoperative when said motor means is deenergized in any position of said shiftable member.

2. The combination with a shiftable transmission operating member, of means for moving said shiftable member comprising a motor means for applying a force thereto, a manually movable control member accessible to the operator and connected to control the energization of said motor means, and a fluid pressure operated device responsive solely to energization of said motor resulting from movement of said control member for opposing all movements of said control member from any position simultaneously with the application of force to said shiftable member whereby the operator always will feel a resistance to the movement of the control member substantially proportional to the resistance encountered by said shiftable member, said device being constructed and arranged to be inoperative when said motor is deenergized in any position of said shiftable member.

3. The combination with a transmission operating member shiftable in opposite directions from a neutral position into different transmission setting positions, of means for moving said operating member comprising a motor for applying a force thereto for moving it in either direction, a manual control member, a control mechanism connected to be controlled by said manual member and by said motor to cause the latter to partake of a follow-up action with respect to said manual member in either direction of movement of said transmission operating member, and means responsive solely to energization of said motor resulting from operation of said control mechanism by said manual member for effecting a force reaction on said manual member substantially proportional to the force developed by said motor, said last named means being constructed and arranged to be inoperative in any position of said transmission operating member when said motor is deenergized.

4. The combination with a transmission operating member shiftable in opposite directions from a neutral position into different transmission setting positions, of means for moving said operating member comprising a fluid pressure motor having a pressure responsive member for applying a force to said operating member for moving it in either direction, a manual control member, a control valve mechanism connected to be operated by said manual member and said motor to cause the pressure responsive member of said motor to partake of a follow-up action with respect to said manual member, and means for utilizing differential pressures in said motor only resulting from operation of said valve mechanism by said manual member for effecting a force reaction on the manual member substantially proportional to the force developed by the fluid pressure motor, said last named means being constructed and arranged to be inoperative in any position of said transmission operating member when pressures are balanced in said fluid pressure motor.

5. The combination with a transmission having a shiftable transmission operating member movable in opposite directions from a neutral position into different transmission setting positions, of a differential fluid pressure motor connected to move said shiftable member in either direction, a source of non-atmospheric pressure, a control valve mechanism for said motor comprising a pair of freely relatively movable valve members normally arranged in a relative neutral position balancing pressures in the ends of said motor and operative when out of said relative neutral position to connect one end of said motor to said source and the other to the atmosphere, manual means for relatively moving said valve members out of their relative neutral position, said valve members being reversely relatively movable upon operation of said motor to tend to restore them to said relative neutral position, and means for resisting relative movement of said valve members in either direction from said relative neutral position, said last named means being constructed and arranged to be inoperative in any position of said shiftable member when said valve members are in relative neutral position.

6. The combination with a transmission having a shiftable transmission operating member movable in opposite directions from a neutral position into different transmission setting positions, of a differential fluid pressure motor connected to move said shiftable member in either direction, a source of non-atmospheric pressure, a control valve mechanism for said motor comprising a pair of freely relatively movable valve members normally arranged in a relative neutral position balancing pressures in the ends of said motor and operative when out of said relative neutral position to connect one end of said motor to said source and the other to the atmosphere, manual means for relatively moving said valve members out of their relative neutral position, said valve members being reversely relatively movable upon operation of said motor to tend to restore them to said relative neutral position, and means for utilizing differential pressures in said motor resulting from relative movement of said valves out of said relative neutral position for effecting a force reaction on the manual means substantially proportional to the force developed by said fluid pressure motor, said last named means being constructed and arranged to be inoperative in any position of said shiftable member when said valve members are in said relative neutral position.

7. The combination with a transmission having a shiftable transmission operating member movable in opposite directions from a neutral position into different transmission setting positions, of a differential fluid pressure motor connected to move said shiftable member in either direction, a source of non-atmospheric pressure, a control valve mechanism for said motor comprising a pair of freely relatively movable valve members normally arranged in a relative neutral position balancing pressures in the ends of said motor and operative when out of said relative neutral position to connect one end of said motor to said source and the other to the atmosphere to generate a force in said motor to move said shiftable member, manual means for relatively moving said valve members out of their relative neutral position, said valve members being reversely relatively movable upon operation of said motor to tend to restore them to said relative neutral position, and means for applying a smaller and substantially proportional force opposing all relative movements of said valve members away from said relative neutral position simultaneously with the application of said first mentioned force whereby any such relative movement of said valve members will be resisted to a degree substantially proportional to the resistance encountered by said shiftable member, said last named means being constructed and arranged to be inoperative in any position of said shiftable member when said valve members are in said relative neutral position.

8. The combination with a transmission having a shiftable transmission operating member movable in opposite directions from a neutral position into different transmission setting positions, of a differential fluid pressure motor, motion transmitting means connected between said motor and said shiftable member, a source of non-atmospheric pressure, a control valve mechanism comprising a pair of freely relatively movable valve members normally arranged in a relative neutral position balancing pressures in the ends of said motor, a manually movable control member connected to relatively move said valve members out of said relative neutral position to connect either end of said motor to said source and the other end to the atmosphere, said valve members being connected to be relatively moved by said motion transmitting means whereby operation of said motor tends to restore said valve members to said relative neutral position, and means for resisting relative movement of said valve members out of said relative neutral position, said last named means being constructed and arranged to be inoperative in any position of said shiftable member when said valve members are in said relative neutral position.

9. The combination with a transmission having a shiftable transmission operating member movable in opposite directions from a neutral position into different transmission setting positions, of a differential fluid pressure motor connected to move said shiftable member, a source of non-atmospheric pressure, a control valve mechanism comprising a pair of freely relatively movable valve members normally arranged in a relative neutral position balancing pressures in the ends of said motor and operative when out of said relative neutral position to connect either end of said motor to said source and the other to the atmosphere, manual means for relatively moving said valve members out of said relative neutral position, means responsive to the operation of said motor for reversely relatively moving said valve members to tend to restore them to said relative neutral position, and means for applying a force reaction to the manual means substantially proportional to the force developed by the fluid pressure motor, said last named means being constructed and arranged to be inoperative in any position of said transmission operating member when said valve members are in said relative neutral position.

10. The combination with a shiftable transmission operating member movable in opposite directions from a neutral position into different transmission setting positions, of a differential fluid pressure motor connected to said shiftable member, a source of non-atmospheric pressure, a pair of valve members normally arranged in relative neutral position balancing pressures in the ends of said motor and freely relatively movable from said relative neutral position to connect one end of said motor to said source and the other end to the atmosphere, means for effecting relative movement of said valve members, means responsive to operation of said motor for tending to restore said valve members to said relative neutral position, and means responsive solely to differential pressures in said motor resulting from movement of said valve members out of said relative neutral position for resisting relative movement of said valve members in either direction from said relative neutral position.

11. The combination with a shiftable transmission operating member movable in opposite directions from a neutral position into different transmission setting positions, of a differential fluid pressure motor connected to said shiftable member, a source of non-atmospheric pressure, a pair of valve members normally arranged in relative neutral position balancing pressures in the ends of said motor and freely relatively movable from said relative neutral position to connect one end of said motor to said source and the other end to the atmosphere, means for effecting relative movement of said valve members, means responsive to operation of said motor for tending to restore said valve members to said relative neutral position, and means responsive solely to differential pressures in said motor resulting from movement of said valve members out of said relative neutral position for resisting relative movement of said valves away from said relative neutral position.

12. The combination with a shiftable transmission operating member movable in opposite directions from a neutral position into different transmission setting positions, of a differential fluid pressure motor connected to said shiftable member, a source of non-atmospheric pressure, a pair of valve members normally arranged in relative neutral position and relatively movable from such position, one valve member having a pair of spaced ports communicating with the respective ends of said motor, said ports being connectible to said source and to the atmosphere, the other valve member having portions cooperating with said ports and operable to disconnect both ports from the atmosphere and connect them to said source when said valve members are in said relative neutral position, or to connect one port to the atmosphere and the other to said source when said valves are relatively moved out of said relative neutral position, means for relatively moving said valve members, means responsive to operation of said motor for tending to restore said valve members to said relative neutral position, and means for resisting relative movement of said valve members away from said relative neutral position.

13. The combination with a shiftable transmission operating member movable in opposite directions from a neutral position into different transmission setting positions, of a differential fluid pressure motor connected to said shiftable member, a source of non-atmospheric pressure, a pair of valve members normally arranged in relative neutral position and relatively movable from such position, one valve member having a pair of spaced ports communicating with the respective ends of said motor, said ports being connectible to said source and to the atmosphere, the other valve member having portions cooperating with said ports and operable to disconnect both ports from the atmosphere and connect them to said source when said valve members are in said relative neutral position, or to connect one port to the atmosphere and the other to said source when said valves are relatively moved out of said relative neutral position, means for relatively moving said valve members, means responsive to operation of said motor for tending to restore said valve members to said relative neutral position, and means responsive in accordance with the differential pressures in said motor for resisting relative movement of said valves away from said relative neutral position.

14. The combination with a pair of shiftable members for providing different gear ratios in a transmission, of an actuating member, crossover means for selectively moving said actuating member into engagement with said shiftable members to select them for actuation, a fluid pressure motor having a pressure responsive member therein connected to said actuating member, a source of partial vacuum, a pair of valve members normally arranged in relative neutral position balancing pressures in the ends of said motor, and freely relatively movable from such relative neutral position to connect one end of said motor to said source and the other to the atmosphere, a common operating handle for controlling said crossover means and effecting relative movement of said valve members out of said relative neutral position, means responsive to operation of said motor for tending to restore said valve members to said relative neutral position, and means responsive solely to differential pressures in said motor resulting from movement of said valve members out of said relative neutral position for reacting against said operating handle to resist movement thereof to a degree proportionate to the resistance encountered by the selected shiftable member.

15. The combination with a pair of shiftable members for providing different gear ratios in a transmission, of an actuating member, crossover means for selectively moving said actuating member into engagement with said shiftable members to select them for actuation, a fluid pressure motor having a pressure responsive member therein connected to said actuating member, a source of partial vacuum, a pair of valve members normally arranged in relative neutral position and relatively movable away from such relative position, one valve member having a pair of spaced ports communicating with the respective ends of said motor, said ports being connectible to said source and to the atmosphere, the other valve member having portions cooperating with said ports to disconnect both ports from the atmosphere and connect them to said source when said valve members are in said relative neutral position, and to connect one port to the atmosphere and the other to said source when said valves are relatively moved out of said relative neutral position, a common operating handle for controlling said crossover means and for relatively moving said valve members, means responsive to operation of said motor for tending to restore said valve members to said relative neutral position, and means reacting against said handle to resist movement of the latter to a degree proportionate to the resistance encountered by the selected shiftable member.

16. The combination with a shiftable transmission operating member shiftable in opposite directions from a neutral position into different transmission setting positions, of a double acting motor for applying a force to said shiftable member, a manually operable member movable in opposite directions from a neutral position and connected to control energization of said motor, and means responsive solely to energization of said motor resulting from movement of said manually operable member for applying a smaller and substantially proportional force to said manually operable member opposing all movements thereof in either direction from any position simultaneously with the application of the first mentioned force to move said shiftable member in either direction, whereby the operator always will feel a resistance to the movement of the manually operable member in either direction from any position substantially proportional to the resistance encountered by said shiftable member, said means being constructed and arranged to be inoperative when said motor is deenergized in any position of said shiftable member.

17. The combination with a shiftable transmission operating member shiftable from a neutral position into different transmission setting positions, of a double acting fluid pressure motor for applying a force to said shiftable member to move it in opposite directions from its neutral position, a manually operable member connected to control the admission of fluid pressures to said motor, and means subject solely to the fluid pressures in said motor for opposing all movements of said manually operable member in either direction from any position simultaneously with the application of force to said shiftable member whereby the operator always will feel a resistance to the movement of the manually operable member in either direction substantially proportional to the resistance encountered by said shiftable member, said means being constructed and arranged to be inoperative when said motor is deenergized in any position of said shiftable member.

18. The combination with a shiftable transmission operating member movable in opposite directions into different transmission setting positions, of an actuating mechanism connected to said shiftable member and including a motor, and a control mechanism connected to control said motor, comprising a manually operable member, means controlled by said manually operable member for determining the energization of said motor, and a single reaction means responsive solely to energization of said motor for providing a smaller force substantially proportional to the force exerted by said motor and acting oppositely with respect to said actuating mechanism, to assist in operating the latter, and said manually operable member, whereby the operator, in any position of said manually operable member and in either direction of movement thereof, will feel a resistance to the movement of said manually operable member substantially proportional to the resistance encountered by said shiftable member, said reaction means being constructed and arranged to be inoperative when said motor is deenergized in any position of said shiftable member.

19. The combination with a transmission operating member shiftable in opposite directions from a neutral position into different transmission setting positions, of an actuating mechanism connected to move said control member and including a double acting motor, and a control mechanism connected to control said motor, comprising a manually operable member movable in opposite directions from a neutral position, means controlled by said manually operable member for determining the energization of said motor, and a single reaction means responsive solely to energization of said motor for generating a smaller force substantially proportional to the force exerted by said motor in either direction of operation thereof, said reaction means acting oppositely with respect to said actuating mechanism, to assist in operating the latter, and said manually operable member, whereby the operator, in any position of said manually operable member and in either direction of movement thereof, will feel a resistance to movement of said manually operable member substantially proportional to the resistance encountered by said shiftable member, said reaction means being constructed and arranged to be inoperative when said motor is deenergized in any position of said shiftable member.

20. The combination with a shiftable transmission operating member movable into different transmission setting positions, of an actuating mechanism connected to actuate said shiftable member, comprising a pair of motors connected in parallel to actuate said shiftable member, each motor having a pair of relatively movable members, a manually operable member connected to one of said motors to be subject to the reaction force therefrom, a source of power, and control means for determining the energization of said motors by said source, said control means being connected for actuation by said manually operable member, said motors being subject to energization solely by said source.

21. The combination with a transmission operating member shiftable in opposite directions from a neutral position into different transmission setting positions, of an actuating mechanism connected to actuate said shiftable member, comprising a pair of fluid pressure motors connected in parallel to actuate said shiftable member, each motor having a pair of relatively movable members constructed and arranged to be reacted upon solely by fluid pressures, a manually operable member connected to one of said motors to be subject to reactions therein according to the degree of pressure therein, and valve means for controlling the energization of said motors, said valve means being connected for actuation by said manually operable member.

22. The combination with a shiftable transmission operating member for providing different gear ratios, of an actuating mechanism connected to move said shiftable member and including a motor and a control mechanism therefor, a manually operable member connected to control said control mechanism, and a mechanical advantage system reacting between said manually operable member and said actuating mechanism, said system comprising a device responsive solely to energization of said motor resulting from operation of said control mechanism by said manually operable member to transmit force to said manually operable member whereby the operator will feel a resistance to the movement of said manually operable member substantially proportional to the resistance encountered by said shiftable member and whereby a force substantially proportional to the force exerted by the operator to move said manually operable member will be transmitted to said actuating mechanism to assist in moving said shiftable member, said mechanical advantage system being constructed and arranged to be subject solely to the force generated in said motor and the force applied to said manually operable member by the operator.

23. The combination with a transmission operating member shiftable in opposite directions from a neutral position into different transmission setting positions, of an actuating mechanism connected to move said shiftable member and including a double acting motor and a control mechanism therefor, a manually operable member movable in opposite directions from a neutral position and connected to control said control mechanism, and a mechanical advantage system reacting between said manually operable member and said actuating mechanism, said system comprising a device responsible solely to energization of said motor resulting from operation of said control mechanism by said manually operable member to transmit force to said manually operable member opposing movement thereof in either direction whereby the operator will feel a resistance to the movement of said manually operable member in either direction substantially proportional to the resistance encountered by said shiftable member and whereby a force substantially proportional to the force exerted by the operator to move said manually operable member in either direction will be transmitted to said actuating mechanism to assist in moving said shiftable member, said mechanical advantage system being constructed and arranged to be subject solely to the force generated in said motor and the force applied to said manually operable member by the operator.

24. The combination with a shiftable transmission operating member, of means for moving said shiftable member comprising motor means for applying a force thereto, a manually operable member, control means connected for operation by said manually operable member to control energization of said motor means, and means responsive solely to energization of said motor resulting from movement of said manually operable member for applying a smaller and substantially proportional force to said control member opposing movement thereof from any position simultaneously with the application of said first mentioned force, whereby the operator always will feel a resistance to the movement of the manually operable member substantially proportional to the resistance encountered by said shiftable member, said last named means being constructed and arranged to be inoperative when said motor means is deenergized in any position of said shiftable member, said control means having a normally inoperative lost motion connection therein operable upon a failure in power in said motor means for transmitting movement from said manually operable member to said shiftable member.

25. The combination with a shiftable transmission operating member, of means for moving said shiftable member comprising motor means for applying a force thereto, a manually operable member, control means connected for operation by said manually operable member to control energization of said motor means, and a fluid pressure operated device responsive solely to energization of said motor resulting from movement of said manually operable member for opposing movement of said control member from any position simultaneously with the application of force to said shiftable member whereby the operator always will feel a resistance to the movement of the manually operable member substantially proportional to the resistance encountered by said shiftable member, said device being constructed and arranged to be inoperative when said motor is deenergized in any position of said shiftable member, said control means having a normally inoperative lost motion connection therein operable upon a failure of power in said motor for completing a direct mechanical connection from said manually operable member to said shiftable member.

26. The combination with a shiftable transmission operating member, of means for moving said shiftable member comprising a fluid pressure operated motor for applying a force thereto, a manually operable member, control means including a valve device connected for operation by said manually operable member to control fluid pressure in said motor means, and a fluid pressure operated device connected to be subject solely to fluid pressures in said motor and connected for opposing movement of said manually operable member from any position simultaneously with the application of force to said shiftable member whereby the operator always will feel a resistance to the movement of the manually operable member substantially proportional to the resistance encountered by said shiftable member, said device being constructed and arranged to be inoperative when said motor is deenergized in any position of said shiftable member, said control means including a normally inoperative lost motion connection operable upon a failure of power in said motor to complete a mechanical force transmitting system between said manually operable member and said shiftable member.

27. The combination with a pair of shiftable members for providing different gear ratios in a transmission, of a selecting mechanism having a member movable for selectively conditioning said shiftable members for actuation, a motor for applying a force to the selected shiftable member for moving it in either direction, a manual control member, a follow-up control mechanism constructed and arranged to be controlled by said manual member in a given path of movement thereof and by said motor to cause the latter to partake of a follow-up action with respect to said manual member in either direction of movement of the selected shiftable member, means responsive solely to energization of said motor for effecting a force reaction on said manual member substantially proportional to the force generated by said motor, said means being constructed and arranged to be inoperative in any position of said transmission operating member when said motor is deenergized, and means constructed and arranged to transmit a different movement of said manual control member to said selecting mechanism wholly independently of said control mechanism.

28. The combination with a pair of shiftable members for providing different gear ratios in a transmission, of a selecting mechanism for selectively conditioning said shiftable members for actuation, a fluid pressure motor having a pressure responsive member for applying a force to the selected shiftable member for moving it in either direction, a manual control member, a follow-up valve mechanism connected to be operated by said manual member in one path of movement thereof and by said motor to cause the pressure responsive member of said motor to partake of a follow-up action with respect to said manual member, means for utilizing differential pressures in said motor only resulting from operation of said valve mechanism by movement of said manual member in said path for effecting a force reaction on said manual member substantially proportional to the force developed by the fluid pressure motor, said means being constructed and arranged to be inoperative in any position of the selected shiftable member when pressures are balanced in said fluid pressure motor, and means connected and arranged to transmit movement of said manual member in a different path to said selecting mechanism wholly independently of said control valve mechanism.

29. The combination with a pair of shiftable members for providing different gear ratios in a transmission, of a selecting mechanism having a member movable for selectively conditioning said shiftable members for actuation, a selecting motor for actuating said movable member, a shifting motor connected to shift the selected shiftable member, a control mechanism connected to control each of said motors, a common operating handle connected to control said control mechanisms, said handle being movable in one direction to control said shifting motor and in another direction to control said selecting motor, and normally inoperative instrumentalities connected to directly transmit movement of said handle in said last named direction to operate the movable means of said selecting mechanism upon failure in power in said selecting motor.

30. The combination with a pair of shiftable members for providing different gear ratios in a transmission, of a selecting mechanism having a member movable for selectively conditioning said shiftable members for actuation, a selecting motor for actuating said movable member, a shifting motor connected to shift the selected shiftable member, a control mechanism connected to control each of said motors, a common operating handle connected to control said control mechanisms, said handle being movable in one direction to control said shifting motor and in another direction to control said selecting motor, normally inoperative instrumentalities connected to directly transmit movement of said handle in said last named direction to operate the movable means of said selecting mechanism upon failure in power in said selecting motor, and means for transmitting movement of said handle in the first named direction to manually move the selected shiftable member upon a failure in power in said shifting motor.

31. The combination with a shiftable transmission operating member, of an arm connected to move said shiftable member, a motor having a movable member projecting from one end thereof and connected to said arm to move the latter upon energization of said motor, control mechanism connected to control said motor and including a body rigidly connected to the other end of said motor, and means connected to universally support said body.

32. The combination with a shiftable transmission operating member, of an arm connected to move said shiftable member, a motor having a movable member projecting from one end thereof and connected to said arm to move the latter upon energization of said motor, control mechanism connected to control said motor and including a body rigidly connected to the other end of said motor, a stationary support, and elastic means carried by said support and connected to said body to support the latter.

33. The combination with a shiftable transmission operating member, of an arm connected to move said shiftable member, a fluid pressure operated motor having a piston therein and a piston rod connected to said piston and extending from one end of said motor for connection with said arm, control valve mechanism for said motor including a body rigidly connected to the other end of said motor, and means for universally supporting said body.

34. The combination with a shiftable transmission operating member, of an arm connected to move said shiftable member, a fluid pressure operated motor having a piston therein and a piston rod connected to said piston and extending from one end of said motor for connection with said arm, control valve mechanism for said motor including a body rigidly connected to the other end of said motor, a rigid support, and elastic means carried by said support and connected to said body to support the latter.

HENRY W. HEY.